(12) United States Patent
Wirz et al.

(10) Patent No.: US 10,056,791 B2
(45) Date of Patent: Aug. 21, 2018

(54) SELF-OPTIMIZING POWER TRANSFER

(75) Inventors: Ben Wirz, Broomfield, CO (US);
James Atwell, Lafayette, CO (US)

(73) Assignee: SPHERO, INC., Boulder, CO (US)

( * ) Notice: Subject to any disclaimer, the term of this patent is extended or adjusted under 35 U.S.C. 154(b) by 418 days.

(21) Appl. No.: 13/549,097

(22) Filed: Jul. 13, 2012

(65) Prior Publication Data

US 2014/0015493 A1   Jan. 16, 2014

(51) Int. Cl.
*H02J 7/00* (2006.01)
*H02J 50/90* (2016.01)
*H02J 50/80* (2016.01)
*H02J 7/02* (2016.01)
*H02J 50/10* (2016.01)
*H02J 5/00* (2016.01)

(52) U.S. Cl.
CPC .............. *H02J 50/90* (2016.02); *H02J 7/025* (2013.01); *H02J 50/10* (2016.02); *H02J 50/80* (2016.02); *H02J 5/005* (2013.01)

(58) Field of Classification Search
CPC .... H02J 7/00; H02J 50/10; H02J 50/12; H02J 50/40; H02J 50/50; H02J 50/60; H02J 50/70; H02J 50/80; H02J 50/90; H02J 17/00; H02J 25/00; Y02T 10/7241; Y04S 30/14; G05D 1/021; G05D 1/0212; G05D 1/0225; G05D 1/027
USPC .................................................. 320/120, 108
See application file for complete search history.

(56) References Cited

U.S. PATENT DOCUMENTS

| | | |
|---|---|---|
| 90,546 A | 5/1869 | Huntington |
| 2,796,601 A | 11/1956 | Hagopian |
| 2,977,714 A | 4/1961 | Gibson |
| 3,313,365 A | 4/1967 | Jackson |
| 3,667,156 A | 6/1972 | Tomiyama |
| 3,683,216 A | 8/1972 | Post |
| 3,821,995 A | 7/1974 | Aghnides |
| 4,310,987 A | 1/1982 | Chieffo |
| 4,519,466 A | 5/1985 | Shiraishi |
| 4,601,675 A | 7/1986 | Robinson |
| 4,733,737 A | 3/1988 | Falamak |
| 4,893,182 A | 1/1990 | Gautraud |
| 4,897,070 A | 1/1990 | Wagstaff |
| 4,996,468 A | 2/1991 | Field et al. |
| 5,087,000 A | 2/1992 | Suto |

(Continued)

FOREIGN PATENT DOCUMENTS

| | | |
|---|---|---|
| CN | 1302717 | 7/2001 |
| CN | 1765595 | 5/2006 |

(Continued)

OTHER PUBLICATIONS

US 9,342,073, 05/2016, Berstein et al. (withdrawn)
(Continued)

*Primary Examiner* — Richard Isla Rodas
*Assistant Examiner* — Michael Dibenedetto

(57) ABSTRACT

A method is disclosed for charging a power source of a device. The method is performed by one or more processors. The one or more processors detect that a charging interface of the device and a charging interface of a charging dock are misaligned when the device is placed into contact or operational proximity with the charging dock. The device is automatically caused to move relative to the charging dock to achieve alignment.

20 Claims, 5 Drawing Sheets

(56) References Cited

U.S. PATENT DOCUMENTS

| | | |
|---|---|---|
| 5,213,176 A | 5/1993 | Oroku et al. |
| 5,297,981 A | 3/1994 | Maxim et al. |
| 5,342,051 A | 8/1994 | Rankin et al. |
| 5,413,345 A | 5/1995 | Nauck |
| 5,439,408 A | 8/1995 | Wilkinson |
| 5,489,099 A | 2/1996 | Rankin et al. |
| 5,513,854 A | 3/1996 | Daver |
| 5,595,121 A | 1/1997 | Elliot |
| 5,628,232 A | 5/1997 | Bakholdin et al. |
| 5,644,139 A | 7/1997 | Allen et al. |
| 5,739,657 A | 4/1998 | Takayama et al. |
| 5,759,083 A | 6/1998 | Polumbaum et al. |
| 5,780,826 A | 7/1998 | Hareyama et al. |
| 5,793,142 A | 9/1998 | Richard |
| 5,871,386 A | 2/1999 | Bart et al. |
| 5,952,796 A | 9/1999 | Colgate et al. |
| 5,953,056 A | 9/1999 | Tucker |
| 6,021,222 A | 2/2000 | Yamagata |
| 6,144,128 A | 11/2000 | Rosen |
| 6,227,933 B1 * | 5/2001 | Michaud ............... A63H 33/005 446/458 |
| 6,246,927 B1 | 6/2001 | Dratman |
| 6,315,667 B1 | 11/2001 | Steinhart |
| 6,320,352 B2 | 11/2001 | Terazoe |
| 6,390,213 B1 | 5/2002 | Bleicher |
| 6,449,010 B1 | 9/2002 | Tucker |
| 6,456,938 B1 | 9/2002 | Bernard |
| 6,458,008 B1 | 10/2002 | Hyneman |
| 6,459,955 B1 | 10/2002 | Bartsch et al. |
| 6,502,657 B2 | 1/2003 | Kerrebrock et al. |
| 6,535,793 B2 | 3/2003 | Allard |
| 6,573,883 B1 | 6/2003 | Bertlett |
| 6,615,109 B1 | 9/2003 | Matsuoka et al. |
| 6,764,373 B1 | 7/2004 | Osawa et al. |
| 6,785,590 B2 | 8/2004 | Kasuga et al. |
| 6,786,795 B1 | 9/2004 | Mullaney et al. |
| 6,789,768 B1 | 9/2004 | Kalisch |
| 6,856,696 B1 | 2/2005 | Ajioka |
| 6,859,555 B1 | 2/2005 | Fang |
| 6,901,110 B1 | 5/2005 | Tsougarakis et al. |
| 6,902,464 B1 | 6/2005 | Lee |
| 6,945,843 B1 | 9/2005 | Motosko |
| 6,980,956 B1 | 12/2005 | Takagi et al. |
| 7,058,205 B2 | 6/2006 | Jepson et al. |
| 7,069,113 B2 | 6/2006 | Matsuoka et al. |
| 7,130,741 B2 | 10/2006 | Bodin et al. |
| 7,170,047 B2 | 1/2007 | Pal |
| 7,173,604 B2 | 2/2007 | Marvit et al. |
| 7,258,591 B2 | 8/2007 | Xu et al. |
| 7,283,647 B2 | 10/2007 | McNitt |
| 7,292,711 B2 | 11/2007 | Kiraly et al. |
| 7,298,869 B1 | 11/2007 | Abernathy |
| 7,324,663 B2 | 1/2008 | Kiraly et al. |
| 7,328,671 B2 | 2/2008 | Kates |
| 7,340,077 B2 | 3/2008 | Gokturk et al. |
| 7,340,344 B2 | 3/2008 | Chappell |
| 7,344,430 B2 | 3/2008 | Hasty et al. |
| 7,409,924 B2 | 8/2008 | Kates |
| 7,424,867 B2 | 9/2008 | Kates |
| 7,432,718 B2 | 10/2008 | Ishihara et al. |
| 7,463,001 B2 | 12/2008 | Tsurukawa |
| 7,499,077 B2 | 3/2009 | Li |
| 7,501,780 B2 * | 3/2009 | Yamamoto ............ G05D 1/0225 318/568.12 |
| 7,526,362 B2 | 4/2009 | Kim et al. |
| 7,538,764 B2 | 5/2009 | Salomie |
| 7,542,597 B2 | 6/2009 | Rahn et al. |
| 7,639,874 B2 | 12/2009 | Bushell et al. |
| 7,699,683 B2 | 4/2010 | Caspi |
| 7,702,131 B2 | 4/2010 | Chinen et al. |
| 7,714,880 B2 | 5/2010 | Johnson |
| 7,714,895 B2 | 5/2010 | Pretlove et al. |
| 7,726,422 B2 | 6/2010 | Sun et al. |
| 7,729,537 B2 | 6/2010 | Grady |
| 7,755,660 B2 | 7/2010 | Nejikovsky et al. |
| 7,773,773 B2 | 8/2010 | Abercrombie |
| 7,822,507 B2 | 10/2010 | Ishihara et al. |
| 7,847,504 B2 | 12/2010 | Hollis |
| 7,853,357 B2 | 12/2010 | Sawada et al. |
| 7,889,226 B2 | 2/2011 | Pescatore et al. |
| 7,957,837 B2 | 6/2011 | Ziegler et al. |
| 7,979,162 B2 | 7/2011 | Niemela et al. |
| 8,025,551 B2 | 9/2011 | Torres et al. |
| 8,038,504 B1 | 10/2011 | Wong |
| 8,077,981 B2 | 12/2011 | Elangovan et al. |
| 8,099,189 B2 | 1/2012 | Kaznov et al. |
| 8,128,450 B2 | 3/2012 | Imai |
| 8,128,500 B1 | 3/2012 | Borst et al. |
| 8,142,287 B2 | 3/2012 | Podoloff |
| 8,144,118 B2 | 3/2012 | Hildreith |
| 8,180,436 B2 | 5/2012 | Boyden et al. |
| 8,190,295 B1 | 5/2012 | Garretson |
| 8,195,333 B2 | 6/2012 | Ziegler et al. |
| 8,210,289 B1 | 7/2012 | Lu et al. |
| 8,258,917 B2 | 9/2012 | Cai et al. |
| 8,269,447 B2 | 9/2012 | Smoot et al. |
| 8,274,406 B2 | 9/2012 | Karlsson et al. |
| 8,275,544 B1 | 9/2012 | Wells et al. |
| 8,326,469 B2 | 12/2012 | Phillips et al. |
| 8,330,639 B2 | 12/2012 | Wong et al. |
| 8,352,643 B2 | 1/2013 | Birnbaum et al. |
| 8,355,818 B2 | 1/2013 | Nielsen et al. |
| 8,364,136 B2 | 1/2013 | Hoffberg et al. |
| 8,376,756 B2 | 2/2013 | Robb |
| 8,392,065 B2 | 3/2013 | Tolstedt et al. |
| 8,396,611 B2 | 3/2013 | Phillips et al. |
| 8,400,619 B1 | 3/2013 | Bernstein et al. |
| 8,417,384 B2 | 4/2013 | Togawa et al. |
| 8,430,192 B2 | 4/2013 | Gillett |
| 8,442,661 B1 | 5/2013 | Blackwell et al. |
| 8,456,298 B2 | 6/2013 | Valtonen |
| 8,459,383 B1 | 6/2013 | Burget |
| 8,522,902 B2 | 9/2013 | Gomi et al. |
| 8,523,846 B2 | 9/2013 | Makino |
| 8,540,038 B1 | 9/2013 | Ullman |
| 8,571,781 B2 | 10/2013 | Bernstein et al. |
| 8,577,595 B2 | 11/2013 | Zhao et al. |
| 8,600,600 B2 | 12/2013 | Jung |
| 8,670,889 B2 | 3/2014 | Kaznov |
| 8,672,062 B2 | 3/2014 | Schroll et al. |
| 8,751,063 B2 | 6/2014 | Bernstein et al. |
| 8,766,983 B2 | 7/2014 | Marks et al. |
| 8,788,130 B1 | 7/2014 | Tran et al. |
| 8,805,947 B1 | 8/2014 | Kuzkin |
| 8,811,675 B2 | 8/2014 | Chadranshekar |
| 8,838,273 B2 | 9/2014 | Hvass et al. |
| 8,862,301 B2 | 10/2014 | Araki et al. |
| 8,882,559 B2 | 11/2014 | Fessenmaier |
| 8,885,882 B1 | 11/2014 | Yin et al. |
| 9,008,860 B2 | 4/2015 | Waldock |
| 9,011,197 B2 | 4/2015 | Smoot et al. |
| 9,014,848 B2 | 4/2015 | Farlow et al. |
| 9,041,622 B2 | 5/2015 | McCulloch |
| 9,090,214 B2 | 7/2015 | Bernstein et al. |
| 9,114,838 B2 * | 8/2015 | Bernstein ............... A63H 30/04 |
| 9,150,263 B2 | 10/2015 | Bernstein et al. |
| 9,193,404 B2 | 11/2015 | Bernstein et al. |
| 9,211,920 B1 | 12/2015 | Bernstein et al. |
| 9,218,316 B2 | 12/2015 | Bernstein et al. |
| 9,280,717 B2 | 3/2016 | Polo et al. |
| 9,290,220 B2 | 3/2016 | Bernstein et al. |
| 9,292,758 B2 | 3/2016 | Polo et al. |
| 9,389,612 B2 | 7/2016 | Bernstein et al. |
| 9,394,016 B2 | 7/2016 | Bernstein et al. |
| 9,395,725 B2 | 7/2016 | Berstein et al. |
| 9,429,940 B2 | 8/2016 | Bernstein et al. |
| 9,457,730 B2 | 10/2016 | Berstein et al. |
| 9,481,410 B2 | 11/2016 | Bernstein et al. |
| 9,483,876 B2 | 11/2016 | Polo et al. |
| 2002/0011368 A1 | 1/2002 | Berg |
| 2002/0036104 A1 | 3/2002 | Kerrebrock et al. |
| 2002/0142701 A1 | 10/2002 | Rosenberg |
| 2003/0093182 A1 | 5/2003 | Yokoyama |
| 2003/0118217 A1 | 6/2003 | Kondo et al. |

(56) References Cited

U.S. PATENT DOCUMENTS

| | | |
|---|---|---|
| 2003/0179176 A1 | 9/2003 | Waterston |
| 2003/0216834 A1 | 11/2003 | Allard |
| 2003/0216835 A1 | 11/2003 | Wakui |
| 2004/0002843 A1 | 1/2004 | Robarts et al. |
| 2004/0015266 A1 | 1/2004 | Skoog |
| 2004/0168837 A1 | 9/2004 | Michaud et al. |
| 2004/0182614 A1* | 9/2004 | Wakui ............... B25J 5/007 180/7.1 |
| 2004/0186623 A1 | 9/2004 | Dooley et al. |
| 2004/0192163 A1 | 9/2004 | Siegel |
| 2004/0198159 A1 | 10/2004 | Xu et al. |
| 2005/0004723 A1 | 1/2005 | Duggan et al. |
| 2005/0091684 A1* | 4/2005 | Kawabata ........... B25J 9/0003 725/35 |
| 2005/0186884 A1 | 8/2005 | Evans |
| 2005/0216186 A1 | 9/2005 | Dorfman |
| 2005/0226192 A1 | 10/2005 | Red et al. |
| 2005/0264472 A1 | 12/2005 | Rast |
| 2006/0080802 A1 | 4/2006 | Tani |
| 2006/0095158 A1 | 5/2006 | Lee et al. |
| 2006/0101465 A1 | 5/2006 | Kato et al. |
| 2006/0132318 A1 | 6/2006 | Shimizu |
| 2006/0241812 A1 | 10/2006 | Juang |
| 2006/0271251 A1 | 11/2006 | Hopkins |
| 2007/0034734 A1 | 2/2007 | Yoeli |
| 2007/0085706 A1 | 4/2007 | Feyereisen et al. |
| 2007/0112462 A1 | 5/2007 | Kim et al. |
| 2007/0150103 A1 | 6/2007 | Im |
| 2007/0162862 A1 | 7/2007 | Ogasawara |
| 2007/0192910 A1 | 8/2007 | Vu |
| 2007/0215394 A1* | 9/2007 | Sun ................... B62D 57/00 180/8.1 |
| 2007/0249422 A1 | 10/2007 | Podoloff |
| 2007/0259592 A1 | 11/2007 | Imai et al. |
| 2007/0282484 A1 | 12/2007 | Chung et al. |
| 2008/0009965 A1 | 1/2008 | Bruemmer et al. |
| 2008/0033641 A1 | 2/2008 | Medalia |
| 2008/0077284 A1 | 3/2008 | Swope |
| 2008/0082208 A1 | 4/2008 | Hong |
| 2008/0086241 A1 | 4/2008 | Phillips et al. |
| 2008/0121097 A1 | 5/2008 | Rudakevych et al. |
| 2008/0174268 A1 | 7/2008 | Koo et al. |
| 2008/0174448 A1 | 7/2008 | Hudson |
| 2008/0182479 A1 | 7/2008 | Elliott et al. |
| 2008/0240507 A1 | 10/2008 | Niwa et al. |
| 2008/0263628 A1 | 10/2008 | Norman et al. |
| 2008/0267450 A1 | 10/2008 | Sugimoto et al. |
| 2008/0269949 A1 | 10/2008 | Norman et al. |
| 2009/0016583 A1 | 1/2009 | Wolf |
| 2009/0018712 A1 | 1/2009 | Duncan |
| 2009/0033623 A1 | 2/2009 | Lin |
| 2009/0055019 A1 | 2/2009 | Stiehl et al. |
| 2009/0057238 A1 | 3/2009 | Garti |
| 2009/0069084 A1 | 3/2009 | Reece |
| 2009/0073034 A1 | 3/2009 | Linsky et al. |
| 2009/0078484 A1 | 3/2009 | Kocijan |
| 2009/0081923 A1 | 3/2009 | Dooley et al. |
| 2009/0133467 A1 | 5/2009 | Mori et al. |
| 2009/0153349 A1 | 6/2009 | Lin |
| 2009/0157221 A1 | 6/2009 | Sip |
| 2009/0161983 A1 | 6/2009 | Ciurea |
| 2009/0164638 A1 | 6/2009 | Jang |
| 2009/0171516 A1 | 7/2009 | Reich |
| 2009/0187299 A1 | 7/2009 | Fregene |
| 2009/0198371 A1 | 8/2009 | Emanuel et al. |
| 2009/0204261 A1 | 8/2009 | Strand et al. |
| 2009/0222148 A1 | 9/2009 | Knotts et al. |
| 2009/0226035 A1 | 9/2009 | Iihoshi et al. |
| 2009/0245656 A1 | 10/2009 | Hu |
| 2009/0256822 A1 | 10/2009 | Amireh et al. |
| 2009/0257741 A1 | 10/2009 | Greb |
| 2009/0262074 A1 | 10/2009 | Nasiri et al. |
| 2009/0265671 A1 | 10/2009 | Sachs et al. |
| 2009/0278932 A1 | 11/2009 | Yi |
| 2009/0284553 A1 | 11/2009 | Seydoux |
| 2009/0316012 A1 | 12/2009 | Matos |
| 2010/0002909 A1 | 1/2010 | Lefevre et al. |
| 2010/0004798 A1 | 1/2010 | Bodin et al. |
| 2010/0010669 A1 | 1/2010 | Lee et al. |
| 2010/0010672 A1 | 1/2010 | Wang et al. |
| 2010/0032224 A1 | 2/2010 | Liu |
| 2010/0057059 A1 | 3/2010 | Makino |
| 2010/0063652 A1 | 3/2010 | Anderson |
| 2010/0066676 A1 | 3/2010 | Kramer et al. |
| 2010/0084513 A1 | 4/2010 | Gariepy et al. |
| 2010/0090661 A1 | 4/2010 | Chen et al. |
| 2010/0106344 A1 | 4/2010 | Edwards et al. |
| 2010/0145236 A1 | 6/2010 | Greenberg et al. |
| 2010/0169098 A1 | 7/2010 | Patch |
| 2010/0172287 A1 | 7/2010 | Krieter |
| 2010/0178982 A1 | 7/2010 | Ehrman |
| 2010/0183195 A1 | 7/2010 | Sharma |
| 2010/0234993 A1 | 9/2010 | Seelinger et al. |
| 2010/0241289 A1 | 9/2010 | Sandberg |
| 2010/0261526 A1 | 10/2010 | Anderson et al. |
| 2010/0264756 A1 | 10/2010 | Lee et al. |
| 2010/0283988 A1 | 11/2010 | Mosier et al. |
| 2010/0302247 A1 | 12/2010 | Perez et al. |
| 2010/0302359 A1 | 12/2010 | Adams |
| 2010/0305778 A1 | 12/2010 | Dorneich et al. |
| 2010/0305781 A1 | 12/2010 | Felix |
| 2010/0312917 A1 | 12/2010 | Allport |
| 2010/0324753 A1 | 12/2010 | Okumatsu |
| 2011/0003640 A9 | 1/2011 | Ehrman |
| 2011/0018731 A1 | 1/2011 | Linsky et al. |
| 2011/0018794 A1 | 1/2011 | Linsky et al. |
| 2011/0022196 A1 | 1/2011 | Linsky et al. |
| 2011/0035054 A1 | 2/2011 | Gal et al. |
| 2011/0050940 A1 | 3/2011 | Lanz et al. |
| 2011/0060492 A1* | 3/2011 | Kaznov ................ B25J 5/00 701/27 |
| 2011/0065488 A1 | 3/2011 | Okamura et al. |
| 2011/0071652 A1 | 3/2011 | Brown et al. |
| 2011/0071702 A1 | 3/2011 | Wang et al. |
| 2011/0082566 A1 | 4/2011 | Herr et al. |
| 2011/0087371 A1 | 4/2011 | Sandberg et al. |
| 2011/0138416 A1 | 6/2011 | Kang et al. |
| 2011/0153885 A1 | 6/2011 | Mak et al. |
| 2011/0156943 A1 | 6/2011 | Wong et al. |
| 2011/0174565 A1 | 7/2011 | Rochat |
| 2011/0183732 A1 | 7/2011 | Block et al. |
| 2011/0184590 A1 | 7/2011 | Duggan et al. |
| 2011/0201362 A1 | 8/2011 | Bregman-Amitai et al. |
| 2011/0132671 A1 | 9/2011 | Lee et al. |
| 2011/0213278 A1 | 9/2011 | Horak et al. |
| 2011/0231013 A1 | 9/2011 | Smoot et al. |
| 2011/0234488 A1 | 9/2011 | Ge et al. |
| 2011/0237324 A1 | 9/2011 | Clavin et al. |
| 2011/0246904 A1 | 10/2011 | Pinto |
| 2011/0249869 A1 | 10/2011 | Stoeffler |
| 2011/0250967 A1 | 10/2011 | Kulas |
| 2011/0249074 A1 | 11/2011 | Cranfill |
| 2011/0273379 A1 | 11/2011 | Chen et al. |
| 2011/0283223 A1 | 11/2011 | Vaittinen et al. |
| 2011/0285349 A1* | 11/2011 | Widmer et al. ............... 320/108 |
| 2011/0286631 A1 | 11/2011 | Wagner et al. |
| 2011/0291926 A1 | 12/2011 | Gokturk et al. |
| 2011/0294397 A1 | 12/2011 | Tsai |
| 2011/0301901 A1 | 12/2011 | Panagas |
| 2011/0304633 A1 | 12/2011 | Beardsley |
| 2011/0308873 A1 | 12/2011 | Kim et al. |
| 2011/0313568 A1 | 12/2011 | Blackwell et al. |
| 2011/0320153 A1 | 12/2011 | Lightcap |
| 2011/0320830 A1 | 12/2011 | Ito |
| 2012/0009845 A1 | 1/2012 | Schmelzer |
| 2012/0035799 A1 | 2/2012 | Ehrmann |
| 2012/0043149 A1 | 2/2012 | Kim et al. |
| 2012/0059520 A1 | 3/2012 | Kossett |
| 2012/0065747 A1 | 3/2012 | Brown et al. |
| 2012/0072023 A1 | 3/2012 | Ota |
| 2012/0083945 A1 | 4/2012 | Oakley et al. |
| 2012/0083962 A1 | 4/2012 | Sato et al. |
| 2012/0099756 A1 | 4/2012 | Sherman et al. |
| 2012/0100915 A1 | 4/2012 | Margalit et al. |

(56) References Cited

U.S. PATENT DOCUMENTS

| | | | |
|---|---|---|---|
| 2012/0106783 A1 | 5/2012 | Chang et al. | |
| 2012/0112553 A1* | 5/2012 | Stoner, Jr. | H02J 5/005 307/104 |
| 2012/0129605 A1 | 5/2012 | Livet | |
| 2012/0143482 A1 | 6/2012 | Goossen et al. | |
| 2012/0146775 A1 | 6/2012 | Kudo et al. | |
| 2012/0149359 A1 | 6/2012 | Huang | |
| 2012/0155724 A1 | 6/2012 | Kitamura | |
| 2012/0167014 A1 | 6/2012 | Joo et al. | |
| 2012/0168240 A1* | 7/2012 | Wilson | A63H 30/04 180/167 |
| 2012/0173018 A1 | 7/2012 | Allen et al. | |
| 2012/0173047 A1 | 7/2012 | Bernstein et al. | |
| 2012/0173050 A1 | 7/2012 | Berstein et al. | |
| 2012/0185115 A1 | 7/2012 | Dean | |
| 2012/0193154 A1 | 8/2012 | Wellborn et al. | |
| 2012/0197439 A1 | 8/2012 | Wang et al. | |
| 2012/0200380 A1 | 8/2012 | Kocijan | |
| 2012/0215355 A1 | 8/2012 | Bewley et al. | |
| 2012/0229647 A1 | 9/2012 | Calman et al. | |
| 2012/0232977 A1 | 9/2012 | Calman et al. | |
| 2012/0233015 A1 | 9/2012 | Calman et al. | |
| 2012/0240077 A1 | 9/2012 | Vaittinen et al. | |
| 2012/0244969 A1* | 9/2012 | Binder | A63H 33/18 473/570 |
| 2012/0258645 A1 | 10/2012 | Cheng | |
| 2012/0262002 A1* | 10/2012 | Widmer | H04B 5/0037 307/104 |
| 2012/0263154 A1 | 10/2012 | Blanchflower et al. | |
| 2012/0291926 A1 | 11/2012 | Misra et al. | |
| 2012/0293548 A1 | 11/2012 | Perez et al. | |
| 2012/0298049 A1 | 11/2012 | Cook et al. | |
| 2012/0298430 A1 | 11/2012 | Schroll et al. | |
| 2012/0302129 A1 | 11/2012 | Persaud | |
| 2012/0306850 A1 | 12/2012 | Balan et al. | |
| 2012/0307001 A1 | 12/2012 | Osako et al. | |
| 2012/0309261 A1 | 12/2012 | Boman | |
| 2012/0311810 A1 | 12/2012 | Gilbert et al. | |
| 2013/0022274 A1 | 1/2013 | Lawrence | |
| 2013/0040533 A1 | 2/2013 | Miller | |
| 2013/0050069 A1 | 2/2013 | Ota | |
| 2013/0065482 A1 | 3/2013 | Trickett | |
| 2013/0105239 A1 | 5/2013 | Fung | |
| 2013/0109272 A1 | 5/2013 | Rindlisbacher | |
| 2013/0113307 A1 | 5/2013 | Kim et al. | |
| 2013/0143482 A1 | 6/2013 | Regier | |
| 2013/0200207 A1 | 8/2013 | Pongratz | |
| 2013/0259386 A1 | 10/2013 | Chadranshekar | |
| 2013/0265225 A1 | 10/2013 | Nasiri et al. | |
| 2013/0293584 A1 | 11/2013 | Anderson et al. | |
| 2013/0307875 A1 | 11/2013 | Anderson et al. | |
| 2014/0008496 A1 | 1/2014 | Ye | |
| 2014/0051513 A1 | 2/2014 | Polo et al. | |
| 2014/0120887 A1 | 5/2014 | Huang | |
| 2014/0207280 A1 | 7/2014 | Duffley | |
| 2014/0238762 A1 | 8/2014 | Berberian et al. | |
| 2014/0249697 A1 | 9/2014 | Fredriksson | |
| 2014/0371954 A1 | 12/2014 | Lee et al. | |
| 2015/0091697 A1 | 4/2015 | Takayasu | |
| 2015/0175202 A1 | 6/2015 | MacGregor | |
| 2015/0268666 A1 | 9/2015 | Wang et al. | |
| 2016/0033967 A1 | 2/2016 | Bernstein et al. | |
| 2016/0054734 A1 | 2/2016 | Bernstein et al. | |
| 2016/0090133 A1 | 3/2016 | Bernstein et al. | |
| 2016/0148367 A1 | 5/2016 | Polo et al. | |
| 2016/0202696 A1 | 7/2016 | Bernstein et al. | |
| 2016/0246299 A1 | 8/2016 | Berberian et al. | |
| 2016/0282871 A1 | 9/2016 | Berstein et al. | |
| 2016/0291591 A1 | 10/2016 | Bernstein et al. | |
| 2016/0291595 A1 | 10/2016 | Halloran | |
| 2016/0349748 A1 | 12/2016 | Bernstein et al. | |

FOREIGN PATENT DOCUMENTS

| | | |
|---|---|---|
| CN | 201147642 | 11/2008 |
| CN | 201220111 | 4/2009 |
| CN | 101426664 | 5/2009 |
| CN | 102060060 | 5/2011 |
| CN | 102421629 | 4/2012 |
| DE | 10146862 | 5/2002 |
| DE | 10 2011 108689 A1 | 4/2012 |
| DE | 102010042395 A1 | 4/2012 |
| EP | 371149 | 6/1990 |
| EP | 1944573 | 7/2008 |
| EP | 1944573 A2 | 7/2008 |
| EP | 1944573 A3 | 7/2008 |
| GB | 3727 | 1/1898 |
| JP | 03182290 A | 8/1991 |
| JP | H07-308462 | 11/1995 |
| JP | 09254838 A | 9/1997 |
| JP | 2000218578 A | 8/2000 |
| JP | 2002126373 | 5/2002 |
| JP | 2004042246 | 2/2004 |
| JP | 2004148439 | 5/2004 |
| JP | 2005165692 | 6/2005 |
| JP | 2007213353 | 8/2007 |
| JP | 2008-040725 A | 2/2008 |
| JP | 2012022457 | 2/2012 |
| JP | 4893862 | 3/2012 |
| KR | 10-2008-040725 A | 8/2008 |
| KR | 10-2008-0073626 A | 8/2008 |
| KR | 10-2008-0092595 A | 10/2008 |
| KR | 10-2009-0000013 A | 1/2009 |
| KR | 20100001408 | 1/2010 |
| KR | 10-2009-69873 | 7/2010 |
| TW | 201015393 | 4/2010 |
| WO | 1997025239 | 7/1991 |
| WO | 2006049559 | 5/2006 |
| WO | 2008008847 | 1/2008 |
| WO | WO-2012/094349 A2 | 7/2012 |
| WO | 2012103525 | 8/2012 |

OTHER PUBLICATIONS

Non-Final Office Action dated Dec. 20, 2013, for related U.S. Appl. No. 13/342,908, filed Jan. 3, 2012, 28 pages.

Non-Final Office Action dated May 13, 2013, for related U.S. Appl. No. 13/342,874, filed Jan. 3, 2012, 17 pages.

Non-Final Office Action dated Jun. 3, 2013, for related U.S. Appl. No. 13/342,914, filed Jan. 3, 2012, 32 pages.

Koshiyama et al., Machine Translation for JP 2000-218578, Aug. 8, 2000, 11 Pages.

Non-Final Office Action dated Jun. 13, 2013, for related U.S. Appl. No. 13/342,908, filed Jan. 3, 2012, 36 pages.

GearBox Ball Prototype Jun. 29, 2010, Pictures from Video [online]. Orbotix, Inc., Jun. 30, 2010, 91 pages. Retrieved from the internet<URL: http://www.youtube.com/watch?v=qRBM7bAaXpU>.

Notification of Transmittal of International Search Report and the Written Opinion of the International Searching Authority dated Aug. 28, 2013, for related PCT Application No. PCT/US2013/041023 filed May 14, 2013, 11 pages.

Notification of Transmittal of International Search Report and the Written Opinion of the International Searching Authority dated Oct. 15, 2013, for related PCT Application No. PCT/US2013/050327 filed Jul. 12, 2013, 13 pages.

Final Office Action dated Nov. 15, 2013, for related U.S. Appl. No. 13/342,892, filed Jan. 3, 2013, 21 pages.

Final Office Action dated Nov. 18, 2013, for related U.S. Appl. No. 13/342,884, filed Jan. 3, 2013, 19 pages.

Final Office Action dated Nov. 18, 2013, for related U.S. Appl. No. 13/342,874, filed Jan. 3, 2012, 21 pages.

Final Office Action dated Nov. 13, 2013, for related U.S. Appl. No. 13/342,914, filed Jan. 3, 2012, 30 pages.

Non-Final Office Action dated Oct. 16, 2012, for related U.S. Appl. No. 13/342,853, filed Feb. 19, 2013, 10 pages.

(56) References Cited

OTHER PUBLICATIONS

Non-Final Office Action dated Apr. 9, 2013, for related U.S. Appl. No. 13/342,892, filed Jan. 3, 2013, 19 pages.
Notification of Transmittal of International Search Report and the Written Opinion of the International Searching Authority dated Dec. 3, 2012, for related PCT Application No. PCT/US2012/020115 filed Jan. 3, 2012, 11 pages.
Non-Final Office Action dated Apr. 16, 2013, for related U.S. Appl. No. 13/342,884, filed Jan. 3, 2013, 20 pages.
Notice of Allowance dated Apr. 19, 2013, for related U.S. Appl. No. 13/342,853, filed Feb. 19, 2013, 11 pages.
European Search Report dated Mar. 11, 2016 for related EP Application No. 13817382.8 filed Jul. 12, 2013.
First Office Action dated Nov. 14, 2016 for CN 201380036857.2 filed Jan. 9, 2015.
Korean Office Action in Application 10-2014-7034020, dated Dec. 23, 2016, 11 pages.
U.S. Appl. No. 13/342,914, Decision on Appeal mailed Feb. 1, 2017, 8 pages.
U.S. Appl. No. 14/884,632, Office Action dated Jan. 25, 2017, 7 pages.
U.S. Appl. No. 14/271,203, Amendment and Response filed Feb. 1, 2017, 12 pages.
"Roll, Pitch, and Yaw, How Things Fly", How Things Fly website, https://howthingsfly.si.edu/flight-dynamics/roll-pitch-and-yaw.
Arioui, "Force Feedback Stabilization for Remote Control of an Assistive Mobile Robot", AACC Publication, 2011, pp. 4898-4903.
Chinese Office Action in Application 201620300686, dated Sep. 9, 2016, 3 pages.
Diolaiti et al., "Tele-operation of a Mobile Robot Through Haptic Feedback", IEEE, 2002, p. 1-6.
European Search Report in Application 12731945.7, dated Nov. 6, 2014, 7 pages.
Halme et al., "Motion Control of a Spherical Mobile Robot", Helsinki, IEEE AMC, 1996, pp. 259-264, 6 pages.
Harmo et al., "Moving Eye—Interactive Teleprescence over Internet with a Ball Shaped Mobile Robot," Automation Tech Lab, Finland, Oct. 2, 2001, 6 pages, http://automation.tkk.fi/files/tervetaas/movingeye4.pdf.
Hashimoto et al., "TouchMe: An Augmented Reality Based Remote Robot Manipulation", Nov. 2011, pp. 61-66.
Joshi et al., "Design, modeling and controllability of a spherical mobile robot", 13th Natl Conf on Mechanism & Machines, IISc, Bangalore, India, Dec. 13, 2007, 6 pages.
Korean Office Action in Application 10-2015-7003642, dated Nov. 28, 2016, 13 pages.
Liu et al., "Motion Control of a Spherical Mobile Robot by Feetback Linearization", 7th WC on IC&A, Jun. 27, 2008, Chongqing, China, 1 page, Abstract Only.
Osorio et al., "Mobile Robots Design and Implementation: From Virtual Simulation to Real Robots", IDME Publication, 2010, 6 pages.
PCT International Search Report in PCT/US2014/037013, dated Aug. 26, 2014, 8 pages.
PCT International Search Report in PCT/US2014/059973, dated Dec. 17, 2014, 11 pages.
PCT International Search Report in PCT/US2014/068606, dated Mar. 2, 2015, 7 pages.
PCT International Search Report in PCT/US2015/030877, dated Aug. 13, 2015, 5 pages.
PCT International Search Report in PCT/US2015/044885, dated Oct. 29, 2015, 7 pages.
Shu, et al., "Motion Control of Spherical Robot Based on Conservation of Angular Momentum", IEEE Intl Conf on Mechatronics & Automation, Aug. 2012, Changchun, China, pp. 599-604, 6 pages.
Simsarian et al., "Achieving Virtual Presence with a Semi-autonomous Robot through a Multi-reality and speech control interface", 1996, pp. 50-63.
U.S. Appl. No. 13/342,853, Amendment and Response filed Feb. 19, 2013, 7 pages.
U.S. Appl. No. 13/342,853, Notice of Allowance dated Jun. 20, 2013, 6 pages.
U.S. Appl. No. 13/342,874, Amendment and Response filed Sep. 13, 2013, 21 pages.
U.S. Appl. No. 13/342,874, Amendment and Response filed Jan. 21, 2014, 13 pages.
U.S. Appl. No. 13/342,874, Amendment and Response filed Jul. 14, 2014, 13 pages.
U.S. Appl. No. 13/342,874, Amendment and Response filed Mar. 5, 2015, 11 pages.
U.S. Appl. No. 13/342,874, Amendment and Response filed Jul. 7, 2015, 9 pages.
U.S. Appl. No. 13/342,874, Notice of Allowance dated Jul. 24, 2015, 18 pages.
U.S. Appl. No. 13/342,874, Notice of Allowance dated Aug. 11, 2015, 3 pages.
U.S. Appl. No. 13/342,874, Office Action dated Apr. 29, 2014, 16 pages.
U.S. Appl. No. 13/342,874, Office Action dated Sep. 4, 2014, 16 pages.
U.S. Appl. No. 13/342,874, Office Action dated Apr. 7, 2015, 8 pages.
U.S. Appl. No. 13/342,884, Amendment and Response filed Sep. 16, 2013, 32 pages.
U.S. Appl. No. 13/342,884, Amendment and Response filed Jan. 21, 2014, 11 pages.
U.S. Appl. No. 13/342,884, Notice of Allowance dated Feb. 19, 2014, 14 pages.
U.S. Appl. No. 13/342,892, Amendment and Response filed Sep. 9, 2013, 27 pages.
U.S. Appl. No. 13/342,892, Amendment and Response filed Feb. 18, 2014, 12 pages.
U.S. Appl. No. 13/342,892, Appeal Brief filed Jul. 17, 2014, 30 pages.
U.S. Appl. No. 13/342,892, Response to Appeal Brief dated Aug. 6, 2014, 16 pages.
U.S. Appl. No. 13/342,908, Advisory Action dated Aug. 11, 2014, 3 pages.
U.S. Appl. No. 13/342,908, Advisory Action dated Sep. 18, 2014, 4 pages.
U.S. Appl. No. 13/342,908, Amendment and Response filed Oct. 15, 2013, 32 pages.
U.S. Appl. No. 13/342,908, Amendment and Response filed Mar. 20, 2014, 21 pages.
U.S. Appl. No. 13/342,908, Amendment and Response filed Aug. 4, 2014, 13 pages.
U.S. Appl. No. 13/342,908, Amendment and Response filed Sep. 5, 2014, 18 pages.
U.S. Appl. No. 13/342,908, Amendment and Response filed Apr. 6, 2015, 12 pages.
U.S. Appl. No. 13/342,908, Notice of Allowance dated Apr. 29, 2015, 12 pages.
U.S. Appl. No. 13/342,908, Office Action dated Jun. 5, 2014, 21 pages.
U.S. Appl. No. 13/342,908, Supplemental Amendment and Response filed Apr. 17, 2015, 10 pages.
U.S. Appl. No. 13/342,914, Advisory Action dated Feb. 13, 2014, 3 pages.
U.S. Appl. No. 13/342,914, Amendment and Response filed Sep. 3, 2013, 24 pages.
U.S. Appl. No. 13/342,914, Amendment and Response filed Feb. 3, 2014, 12 pages.
U.S. Appl. No. 13/342,914, Appeal Brief filed Jul. 3, 2014, 27 pages.
U.S. Appl. No. 13/342,914, Response to Appeal Brief dated Jul. 29, 2014, 10 pages.
U.S. Appl. No. 13/766,455, Amendment and Response filed Jul. 15, 2015, 11 pages.
U.S. Appl. No. 13/766,455, Notice of Allowance dated Aug. 20, 2015, 15 pages.
U.S. Appl. No. 13/766,455, Office Action dated Apr. 15, 2015, 9 pages.

(56) References Cited

OTHER PUBLICATIONS

U.S. Appl. No. 13/894,247, Amendment and Response filed Aug. 13, 2015, 9 pages.
U.S. Appl. No. 13/894,247, Notice of Allowance dated Oct. 29, 2015, 7 pages.
U.S. Appl. No. 13/894,247, Office Action dated Jun. 12, 2015, 14 pages.
U.S. Appl. No. 14/035,841 Amendment and Response filed Sep. 14, 2015, 12 pages.
U.S. Appl. No. 14/035,841, Notice of Allowance dated Sep. 25, 2015, 5 pages.
U.S. Appl. No. 14/035,841, Notice of Allowance dated Oct. 7, 2015, 2 pages.
U.S. Appl. No. 14/035,841, Notice of Allowance dated Oct. 16, 2015, 2 pages.
U.S. Appl. No. 14/035,841, Office Action dated May 13, 2015, 12 pages.
U.S. Appl. No. 14/054,636, Amendment and Response filed Mar. 17, 2016, 13 pages.
U.S. Appl. No. 14/054,636, Amendment and Response filed Sep. 23, 2016, 14 pages.
U.S. Appl. No. 14/054,636, Notice of Allowance dated Dec. 21, 2016, 8 pages.
U.S. Appl. No. 14/054,636, Office Action dated Jan. 20, 2016, 14 pages.
U.S. Appl. No. 14/054,636, Office Action dated Jun. 24, 2016, 23 pages.
U.S. Appl. No. 14/137,954, Amendment and Response filed Aug. 3, 2015, 14 pages.
U.S. Appl. No. 14/137,954, Amendment and Response filed Feb. 5, 2016, 11 pages.
U.S. Appl. No. 14/137,954, Amendment and Response filed Jun. 6, 2016, 12 pages.
U.S. Appl. No. 14/137,954, Notice of Allowance dated Sep. 26, 2016, 8 pages.
U.S. Appl. No. 14/137,954, Office Action dated May 4, 2015, 26 pages.
U.S. Appl. No. 14/137,954, Office Action dated Nov. 5, 2015, 31 pages.
U.S. Appl. No. 14/137,954, Office Action dated Apr. 12, 2016, 27 pages.
U.S. Appl. No. 14/148,541, Amendment and Response filed Sep. 4, 2015, 14 pages.
U.S. Appl. No. 14/148,541, Notice of Allowance dated Nov. 18, 2015, 11 pages.
U.S. Appl. No. 14/148,541, Office Action dated Jun. 4, 2015, 18 pages.
U.S. Appl. No. 14/261,288, Amendment and Response filed Nov. 5, 2015, 12 pages.
U.S. Appl. No. 14/261,288, Notice of Allowance dated Nov. 23, 2015, 10 pages.
U.S. Appl. No. 14/261,288, Office Action dated Jul. 7, 2015, 13 pages.
U.S. Appl. No. 14/271,203, Advisory Action dated Mar. 2, 2016, 3 pages.
U.S. Appl. No. 14/271,203, Amendment and Response filed Oct. 26, 2015, 10 pages.
U.S. Appl. No. 14/271,203, Amendment and Response filed Feb. 23, 2016, 9 pages.
U.S. Appl. No. 14/271,203, Amendment and Response filed Mar. 11, 2016, 9 pages.
U.S. Appl. No. 14/271,203, Amendment and Response filed Jun. 6, 2016, 9 pages.
U.S. Appl. No. 14/271,203, Office Action dated Jul. 27, 2015, 11 pages.
U.S. Appl. No. 14/271,203, Office Action dated Dec. 21, 2015, 10 pages.
U.S. Appl. No. 14/271,203, Office Action dated Apr. 4, 2016, 10 pages.
U.S. Appl. No. 14/271,203, Office Action dated Aug. 1, 2016, 17 pages.
U.S. Appl. No. 14/459,235, Notice of Allowance dated Mar. 6, 2015, 9 pages.
U.S. Appl. No. 14/459,235, Notice of Allowance dated Jun. 25, 2015, 7 pages.
U.S. Appl. No. 14/663,446, Notice of Allowance dated Sep. 25, 2015, 9 pages.
U.S. Appl. No. 14/691,349, Amendment and Response filed Aug. 28, 2015, 11 pages.
U.S. Appl. No. 14/691,349, Amendment and Response filed Jan. 26, 2016, 6 pages.
U.S. Appl. No. 14/691,349, Notice of Allowance dated Mar. 4, 2016, 5 pages.
U.S. Appl. No. 14/691,349, Notice of Allowance dated Jun. 6, 2016, 5 pages.
U.S. Appl. No. 14/691,349, Office Action dated Jul. 17, 2015, 9 pages.
U.S. Appl. No. 14/832,801, Amendment and Response filed Feb. 5, 2016, 10 pages.
U.S. Appl. No. 14/832,801, Amendment and Response filed Feb. 12, 2016, 8 pages.
U.S. Appl. No. 14/832,801, Notice of Allowance dated Mar. 22, 2016, 10 pages.
U.S. Appl. No. 14/832,801, Notice of Allowance dated May 11, 2016, 5 pages.
U.S. Appl. No. 14/832,801, Office Action dated Nov. 6, 2015, 6 pages.
U.S. Appl. No. 14/839,610, Amendment and Response filed Feb. 18, 2016, 11 pages.
U.S. Appl. No. 14/839,610, Notice of Allowance dated Mar. 23, 2016, 16 pages.
U.S. Appl. No. 14/839,610, Office Action dated Nov. 18, 2015, 7 pages.
U.S. Appl. No. 14/850,910, Amendment and Response filed Feb. 18, 2016, 7 pages.
U.S. Appl. No. 14/850,910, Notice of Allowance dated Mar. 17, 2016, 11 pages.
U.S. Appl. No. 14/850,910, Office Action dated Nov. 25, 2015, 8 pages.
U.S. Appl. No. 14/968,594, Amendment and Response filed Apr. 5, 2016, 7 pages.
U.S. Appl. No. 14/968,594, Notice of Allowance dated Jul. 19, 2016, 6 pages.
U.S. Appl. No. 14/968,594, Office Action dated Feb. 3, 2016, 5 pages.
U.S. Appl. No. 14/975,510, Amendment and Response filed May 12, 2016, 8 pages.
U.S. Appl. No. 14/975,510, Notice of Allowance dated Jul. 7, 2016, 5 pages.
U.S. Appl. No. 14/975,510, Office Action dated Feb. 12, 2016, 6 pages.
U.S. Appl. No. 15/017,211, Notice of Allowance dated Jul. 5, 2016, 10 pages.
U.S. Appl. No. 15/017,211, Notice of Allowance dated Aug. 8, 2016, 4 pages.
U.S. Appl. No. 15/232,490, Office Action dated Sep. 23, 2016, 5 pages.
European Search Report in Application 13790911.5, dated Oct. 14, 2016, 10 pages.
Loy et al., "Fast Radial Symmetry for Detecing Points of Interest", IEEE Transactions on Pattern Analysis and Machine Intelligence, IEEE Computer Society, USA, vol. 25, No. 8, Aug. 1, 2003, 15 pages.
European Search Report in Application 14795148.7, dated Dec. 7, 2016, 7 pages.
Chinese Office Action in Application 201620300686.0, dated Feb. 3, 2016, 5 pages.
Chinese Office Action in Application 201702030180700, dated Feb. 7, 2017, 8 pages.
Japanese Office Action in Application 2015-512768, dated Dec. 6, 2016, 9 pages.

(56) References Cited

OTHER PUBLICATIONS

PCT International Preliminary Report on Patentability in PCT/US2015/030877, dated Feb. 23, 2017, 5 pages.
PCT International Preliminary Report on Patentability in PCT/US2015/044885, dated Feb. 23, 2017, 5 pages.
U.S. Appl. No. 14/054,636, Notice of Allowance dated Mar. 1, 2017, 7 pages.
U.S. Appl. No. 14/271,203, Office Action dated Feb. 21, 2017, 12 pages.
U.S. Appl. No. 15/232,490, Amendment and Response filed Feb. 22, 2017, 3 pages.
Chinese Notice of Allowance in Application 201510463336.6, dated Nov. 17, 2017, 4 pages.
European Office Action in Application 12731845.7, dated Oct. 25, 2017, 6 pages.
European Office Action in Application 13817382.8, dated Nov. 14, 2017, 5 pages.
Japanense Office Action in 2015-512768, dated Sep. 26, 2017,10 pages.
Japanese Office Action in Application 2015-521853, dated Oct. 31, 2017, 6 pages.
U.S. Appl. No. 14/271,203, Office Action dated Oct. 18, 2017, 13 pages.
U.S. Appl. No. 14/933,827, Amendment and Response filed Oct. 20, 2017, 6 pages.
U.S. Appl. No. 14/933,827, Office Action dated Nov. 22, 2017, 8 pages.
U.S. Appl. No. 15/177,809, Amendment and Response filed Nov. 17, 2017, 7 pages.
U.S. Appl. No. 15/180,485, Amendment and Response filed Nov. 17, 2017, 11 pages.
U.S. Appl. No. 15/180,485, Office Action dated Dec. 7, 2017, 9 pages.
A. Milelle et al., "Model-Based Relative Localization for Cooperative Robots Using Stero Vision", Dec. 3, 2005, https://infoscience.epfi.ch/record/97591/files/Model-Based_Relative_Localization_MILELLA05.pdf.
European Office Action in Application 13790911.5, dated Jan. 26, 2018, 7 pages.
U.S. Appl. No. 14/146,631, Office Action dated Feb. 2, 2018, 12 pages.
U.S. Appl. No. 14/271,203, Advisory Action dated Jan. 18, 2018, 3 pages.
U.S. Appl. No. 14/271,203, Amendment and Response filed Dec. 22, 2017, 12 pages.
U.S. Appl. No. 14/933,827, Advisory Action dated Dec. 28, 2017, 2 pages.
U.S. Appl. No. 14/933,827, Amendment and Response filed Dec. 18, 2017, 6 pages.
U.S. Appl. No. 15/010,337, Office Action dated Dec. 22, 2017, 12 pages.
U.S. Appl. No. 15/146,631, Amendment and Response filed Dec. 18, 2017, 9 pages.
U.S. Appl. No. 15/281,478, Amendment and Response filed Jan. 29, 2018, 8 pages.
U.S. Appl. No. 15/281,478, Office Action dated Dec. 15, 2017, 6 pages.
U.S. Appl. No. 15/177,809, Notice of Allowance dated Dec. 12, 2017, 8 pages.
U.S. Appl. No. 15/180,485, Amendment and Response filed Dec. 22, 2017, 8 pages.
U.S. Appl. No. 15/180,485, Notice of Allowance dated Jan. 26, 2018, 10 pages.
Chinese Office Action in Application 201480029695.4, dated May 27, 2017, 22 pages.
Chinese Office Action in Application 201510463007.1, dated May 31, 2017, 8 pages.
Chinese Office Action in Application 201620300686, dated May 2, 2017, 2 pages. (No English Translation).
European Extended Search Report in Application 14853882.0, dated Jun. 22, 2017, 6 pages.
European Office Action in Application 13817383.8, dated Apr. 20, 2017, 6 pages.
Korean Office Action in Application 10-2014-7034020, dated Jun. 30, 2017, 11 pages.
U.S. Appl. No. 13/342,892, Board Decision dated May 5, 2017, 8 pages.
U.S. Appl. No. 13/342,892, Notice of Allowance dated Jun. 7, 2017, 7 pages.
U.S. Appl. No. 13/342,892, Supplemental Notice of Allowance dated Jun. 29, 2017, 2 pages.
U.S. Appl. No. 14/054,636, Notice of Allowance dated Jul. 7, 2017, 7 pages.
U.S. Appl. No. 14/137,954, Notice of Allowance dated Jun. 29, 2017, 8 pages.
U.S. Appl. No. 14/884,632, Notice of Allowance dated May 15, 2017, 8 pages.
U.S. Appl. No. 14/884,632, Supplemental Notice of Allowance dated Jun. 1, 2017, 2 pages.
U.S. Appl. No. 15/040,331, Amendment and Response filed Jul. 10, 2017, 10 pages.
U.S. Appl. No. 15/146,631, Office Action dated May 16, 2017, 11 pages.
U.S. Appl. No. 15/232,490, Amendment and Response filed Jul. 10, 2017, 3 pages.
U.S. Appl. No. 15/281,478, Office Action dated May 5, 2017, 5 pages.
U.S. Appl. No. 14/054,636, Supplemental Notice of Allowance dated Aug. 2, 2017, 4 pages.
Chinese Office Action in Application 201510463336.6, dated Jul. 17, 2017, 5 pages. (No English Translation).
U.S. Appl. No. 15/040,331, Notice of Allowance dated Aug. 1, 2017, 9 pages.
U.S. Appl. No. 14/884,632, Supplemental Notice of Allowance dated Jul. 28, 2017, 2 pages.
U.S. Appl. No. 13/342,892, Supplemental Notice of Allowance dated Jul. 26, 2017, 2 pages.
Chinese Notice of Allowance in Application 201380036857.2, dated Aug. 1, 2017, 4 pages.
U.S. Appl. No. 14/137,954, Supplemental Notice of Allowance dated Jul. 27, 2017, 2 pages.
Korean Notice of Allowance in Application 10-2015-7003642, dated Jul. 25, 2017, 4 pages.
U.S. Appl. No. 14/271,203, Amendment and Response filed Aug. 18, 2017, 11 pages.
U.S. Appl. No. 15/146,631, Amendment and Response filed Aug. 18, 2017, 10 pages.
U.S. Appl. No. 15/177,809, Office Action dated Aug. 16, 2017, 6 pages.
U.S. Appl. No. 15/180,485, Office Action dated Aug. 17, 2017, 9 pages.
U.S. Appl. No. 15/232,490, Notice of Allowance dated Aug. 10, 2017, 5 pages.
U.S. Appl. No. 15/281,478, Amendment and Response filed Sep. 5, 2017, 8 pages.
Wright's Brothers Propulsion System, Smithsonian national Air and Space Museum, retrieved Aug. 17, 2017, https://airandspace.si.edu/exhibitions/wright-brothers/online/fly/1903/propulsion.cfm, 5 pages.
U.S. Appl. No. 15/232,490, Notice of Allowance dated Sep. 21, 2017, 7 pages.
U.S. Appl. No. 15/146,631, Office Action dated Sep. 21, 2017, 14 pages.
European Search Report in Application 15831882.4, dated Mar. 1, 2018, 16 pages.
Chinese Notice of Allowance in Application 201510463007.1, dated Mar. 5, 2018, 6 pages.
Chinese Office Action in Application 201480029695.4, dated Feb. 23, 2018, 14 pages.
U.S. Appl. No. 15/281,478, Notice of Allowance dated Feb. 22, 2018, 8 pages.

(56) References Cited

OTHER PUBLICATIONS

U.S. Appl. No. 14/271,203, Office Action dated Apr. 6, 2018, 13 pages.
U.S. Appl. No. 15/146,631, Advisory Action dated Apr. 23, 2018, 2 pages.
U.S. Appl. No. 14/933,827, Amendment and Response filed Mar. 29, 2018, 6 pages.
U.S. Appl. No. 15/177,809, Supplemental Notice of Allowance dated Mar. 15, 2018, 2 pages.
U.S. Appl. No. 15/177,809, Supplemental Notice of Allowance dated Mar. 21, 2018, 2 pages.
U.S. Appl. No. 15/180,485 Supplemental Notice of Allowance dated Mar. 15, 2018, 2 pages.
U.S. Appl. No. 14/933,827, Office Action dated May 10, 2018, 7 pages.

* cited by examiner

SELF-OPTIMIZING POWER TRANSFER

BACKGROUND OF THE INVENTION

Self-propelled devices typically operate off of internal batteries. Such devices typically have a need to recharge batteries. Many devices use charging stations or docks to recharge batteries.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
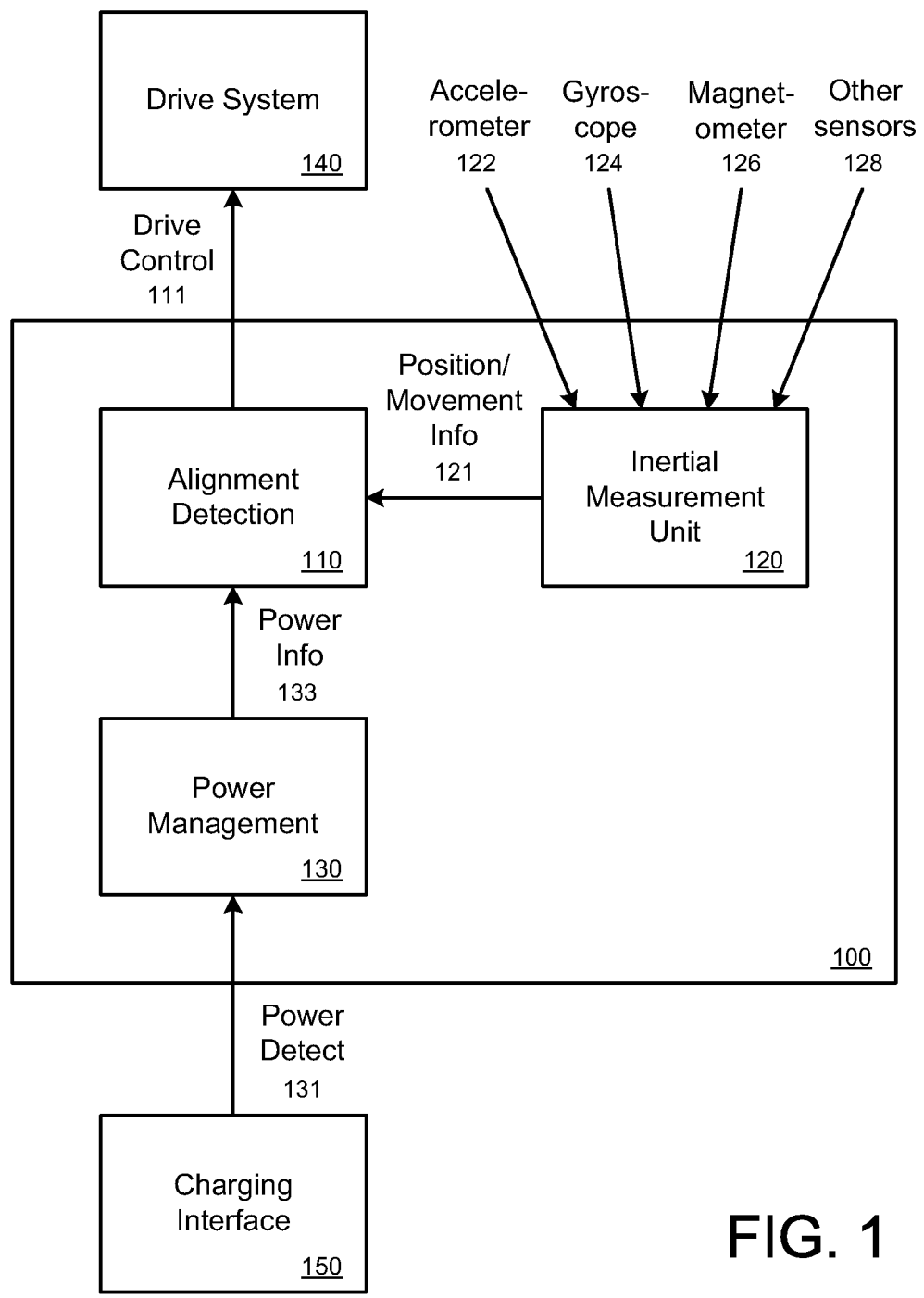
FIG. 1 illustrates an example system for a self-optimizing power transfer device, under an embodiment.

Embodiments described herein provide for a self-propelled device that is able to automatically move or adjust its position relative to a charging station or dock when it detects that its charging interface is misaligned with a charging interface of the charging station.

In some embodiments, the self-propelled device can include a drive system (e.g., a drive mechanism) that enables the device to move in one or more directions, and in various speeds. When the device detects that its charging interface is misaligned with the charging interface of the charging station or dock, the device can automatically control its drive system to move, thereby achieving alignment. In some cases, the self-propelled device can be referred to by different terms and phrases, including robot, robotic device, controlled device, smart device, computing device, autonomous device, remote device, and remote-controlled device. In some embodiments, a self-propelled device can be configured to autonomously move around without user input.

In one embodiment, the charging station can include an inductive charging interface that enables power to be transferred inductively to an inductive charging interface of the device. The device can receive power from the charging station when the device is positioned so that its inductive charging interface is aligned or substantially aligned with the inductive charging interface of the charging station. For example, the self-propelled device can be docked to the charging station (e.g., at least a portion of the housing of the device can be in contact with a portion of the housing or surface of the charging station) or be placed in operational proximity with the charging station. Operational proximity is defined to be sufficient proximity between the device and the charging station in order to enable one device to transfer power inductively to the other. In this manner, a power source of the device, such as one or more rechargeable batteries, can be recharged via the power transfer between the inductive charging interfaces.

According to one or more embodiments, the device can detect that its charging interface and the charging interface of the charging station is misaligned by monitoring the power transmission from the charging station to the device. By monitoring the power transmission, the device can determine whether the amount of power being received from the charging station is less than a threshold amount (e.g., receiving power less than a certain power level or receiving power less than a certain percent). If the amount of power received is less than the threshold amount (e.g., during an interval of time), the device can determine that there is misalignment.

In another embodiment, the device can detect that its charging interface and the charging interface of the charging station are misaligned by using inputs detected by one or more sensors of the device. The device can include, for example, one or more accelerometers, one or more gyroscopes, or one or more magnetometers that provide sensor inputs to the device. Using inputs detected by the one or more sensors, the device can determine its state and/or position and/or orientation with respect to the charging station. Based on these inputs, the device can determine whether its charging interface is aligned with the charging interface of the charging station. In addition, the device can use the inputs and other information to search for the location of maximum power transfer (e.g., a location on the charging station).

Embodiments also provide for a charging station for a self-propelled device that includes a contoured receptacle to receive the self-propelled device. The self-propelled device can have a spherical shape to fit in the receptacle of the charging station. The self-propelled device can automatically change its position and/or orientation within the receptacle when it detects that its charging interface is misaligned from the charging interface of the charging station.

One or more embodiments described herein provide that methods, techniques, and actions performed by a device are performed programmatically, or as a computer-implemented method. Programmatically, as used herein, means through the use of code or computer-executable instructions. These instructions can be stored in one or more memory resources of the device. A programmatically performed step may or may not be automatic.

One or more embodiments described herein can be implemented using programmatic modules or components. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of processing and memory resources. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example system for a self-optimizing power transfer device, under an embodiment. A system such as described with respect to FIG. 1 can be implemented on, for example, a self-propelled or robotic device, or in another example, can be implemented, in part, on the self-propelled device, and also in part, on a computing device that is remote from the self-propelled device. In one embodiment, system 100 can detect whether a charging interface of the self-propelled device and a charging interface of a charging station is misaligned when the self-propelled device is being charged by the charging station. If misalignment is detected, system 100 can automatically cause the self-propelled device to move or adjust its position on the charging station in order to achieve alignment.

According to an embodiment, system 100 includes components such as alignment detection 110, inertial measurement unit 120, and power management 130. These components of system 100 can be implemented through separate hardware and/or software (e.g., through a combination of memory and processing resources of the self-propelled device). In one embodiment, the alignment detection 110 and the inertial measurement unit 120 are implemented as separate software components that are executed on, for example, a processor of the self-propelled device. The components of system 100 combine to (i) detect that the self-propelled device is being charged by a charging station or dock, (ii) determine that a charging interface of the self-propelled device and a charging interface of the charging station is misaligned, and (iii) automatically cause the self-propelled device to move on the charging station to achieve alignment when misalignment is present.

In one embodiment, system 100 also communicates with a drive system 140 and a charging interface 150. The self-propelled device can correspond to a remote-controlled or robotic device that is capable of moving in one or more directions. For example, the self-propelled device can be a radio-controlled vehicle (e.g., a toy car), aircraft, helicopter, hovercraft, balloon, boat, submarine, spherical ball, vacuum cleaner, etc., that is capable of moving either autonomously or via user control from a remote computing device (e.g., a remote control or a smart phone). The drive system 140 can enable the self-propelled device to move.

According to different implementations, the drive system 140 can include one or more motors, one or more actuators, one or more propellers, one or more wheels, one or more axles, one or more gear drives, etc., that enable the self-propelled device to move in one or more directions and in various distances and speeds (e.g., in the air, in the water, on the ground) in response to commands or control signals from a controller component (not illustrated in FIG. 1). In some embodiments, one or more components of system 100 can be implemented, at least in part, by the controller component (e.g., the alignment detection 120 can be part of a controller component).

The self-propelled device can also be powered by a power source (e.g., one or more batteries) that can be rechargeable or replaced. The power source can be coupled to a charging interface 150 so that the power source can be recharged without having the user remove and replace the power source. In one embodiment, the charging interface 150 can include electrical contacts that are exposed on the housing (or can be exposed by a user removing a cover) of the self-propelled device to enable a user to connect a power cable (e.g., from an AC adapter, a micro-USB cable) to the charging interface 150 or to enable the user to place the self-propelled device on a charging station with electrical contacts that can mate with the contacts of the charging interface 150. The charging interface 150 can receive power from an external power source in order to recharge the power source of the self-propelled device.

In some embodiments, the housing of the self-propelled device can be shaped or configured so that no electrical contacts are exposed on the housing. For example, in some cases, having a charging mechanism that does not require a user to plug in a cord can be easy to use. According to embodiments, the charging interface 150 can be an inductive charging interface so that it can inductively receive power from another inductive charging interface of a charging station or dock (not illustrated in FIG. 1). The inductive charging interface allows for power to be received without using a wired electrical connection from the charging station. The charging interface 150 can then receive magnetic energy (e.g., via one or more coils) and convert it to electrical energy in order to recharge the power source of the self-propelled device.

The power management 130 can detect power 131 being received from the charging station via the charging interface 150. In some embodiments, the power management 130 can measure the amount of power being received by communicating with the charging interface 150 and/or by measuring the power source itself (e.g., determining that the amount of energy of one or more batteries is being increased). The power management 130 can, for example, detect power 131 being received by the charging interface 150 and measure the amount of power being received per second or per minute (or other duration of time). In other embodiments, the power management 130 can also determine the fluctuation of the amount of power being received from the charging station within a time period (e.g., detect that power is being received for a short period of time, then power not being received, then power being received again, etc.). The power management 130 can then provide the power information 133 of the received power 133 to the alignment detection 110.

The alignment detection 110 can use the power information 133 to detect whether the power source of the self-propelled device is being charged. In one embodiment, when the alignment detection 110 detects that charging is taking place, the alignment detection 110 can send a signal to a controller component of the self-propelled device to place the device in a charging mode or operation. In other embodiments, the device can also use information provided by other components or mechanisms to determine whether charging is taking place (e.g., the user indicates charging via a user input mechanism, or a sensor of the charging station or the device detects placement of the device).

According to embodiments, the alignment detection 110 can also use the power information 131 in order to determine the power transmission efficiency between the self-propelled device and the charging station when power is being received via the charging interface 150. For example, the alignment detection 110 can use information about the charging settings, capabilities, and/or specifications of the self-propelled device to determine a threshold amount of power (or rate of power) the charging interface 150 should be receiving under optimal or efficient conditions (e.g., the threshold can correspond to an efficient power transmission). The alignment detection 110 can compare the current receiving power conditions via the power information 131 (e.g., in terms of absolute values or percentages) with the optimal/efficient power threshold levels in order to determine whether power is being transferred efficiently. If the received power amount is less is than the threshold, the alignment detection 110 can determine that the charging interface 150 of the self-propelled device is not substantially or efficiently aligned (e.g., is deemed to be misaligned) with the charging interface of the charging station. As used herein, the term "substantial" or its variants (e.g., "substantially") is intended to mean at least 90% of the stated quantity, measurement or expression.

For example, the charging interfaces of the device and the charging station can be inductive charging interfaces. When the device and the charging station are placed in operational proximity with each other (e.g., sufficient proximity to enable the charging station to transfer power inductively to the device), the power information 131 can indicate that the device is receiving power and the power management 130 can use the information to determine how much power is being received.

In some embodiments, the charging interface 150 of the device can include a pair of electrical contacts that is to be coupled or mated with a pair of contacts on a surface of the charging station. When the charging interfaces of the device and charging station are properly (e.g., substantially) aligned, power can be efficiently transferred from the charging station to the charging interface 150 of the device. However, if the device is placed into contact with the surface of the charging station so that the charging interfaces of the device and the charging station are misaligned (e.g., the pair of contacts are not substantially aligned), for example, there can be a fluctuation of power being transferred within a time period so that power is received for a short period of time, then not received, then being received again, etc. When such condition is present, the alignment detection 110 can determine that a misalignment of the charging interfaces exists.

In some embodiments, the alignment detection 110 can also determine whether there is a misalignment of the charging interfaces by using position and/or orientation and/or movement information 121 received from the inertial measurement unit (IMU) 12. According to various embodiments, the alignment detection 110 can detect an amount of misalignment by using just the power information 133 or just the position/movement information 121, or by using both.

According to an embodiment, the self-propelled device can include one or more sensors, such as one or more accelerometers 122, one or more gyroscopes 124, one or more magnetometers 126, or one or more other sensing mechanisms 128. These sensors can provide sensor input about the current state of the self-propelled device with respect to the surrounding environment to the IMU 120. For example, a sensor 122, 124, 126, individually or in combination with one or more other sensors 128, can provide input to the IMU 120 so that system 100 can be aware of or maintain information of the device's position and/or orientation and/or movement relative to a reference point (e.g., the ground or in the direction of gravity).

In some embodiments, the alignment detection 110 can communicate with or be part of a controller component of system 100, which can also receive the position/movement information 121 from the IMU 120. Using the position/movement information 121, the controller component can measure or estimate the current/present state (e.g., stationary or moving) and/or position of the self-propelled device, including various rotational angles about three axes (relative to the center of the device), such as pitch, roll, and yaw angles. The controller component of system 100 can also use this information to provide drive control signals 111 to the drive system 140 for controlling the movement of the self-propelled device.

According to an embodiment, when the self-propelled device is being charged (e.g., placed into contact with a surface of the charging station and receiving at least some amount of power from the charging station), the alignment detection 110 can use the current position/movement information 121 of the device (at the time the device begins to recharge) to determine whether the device is properly positioned or oriented on the surface of the charging station. For example, the alignment detection 110 can use information corresponding to the optimal position/orientation of the self-propelling device and compare it with the current position/movement information 121 of the self-propelling device. If the current position/movement information 121 is within a certain percentage or threshold corresponding to the optimal position/orientation of the self-propelling device (e.g., plus or minus 5 degrees with respect to each of the pitch, roll, or yaw angles), the alignment detection 110 can determine that the charging interface 150 is in a proper charging position and that the charging interface 150 is substantially aligned with the charging interface of the charging station. In other embodiments, based on the current position/movement information 121, the alignment detection 110 can also determine the amount of misalignment (e.g., that the pitch rotational angle is misaligned by a certain degree, while the roll rotational angle is misaligned by a different amount).

Based on at least one of the power information 133 or the position/movement information 121, the alignment detection 110 can detect whether or not the charging interface 150 of the self-propelled device is substantially aligned with the charging interface of the charging station. If the alignment detection 110 detects that the charging interfaces are misaligned (e.g., not substantially aligned), the alignment detection 110 can automatically cause the device to move, rotate, and/or reposition itself with respect to the surface of the charging station in order to achieve alignment. For example, the alignment detection 110 can cause the device to continue to move (e.g., rock back and forth, and left to right) until the power management 130 provides power information 133 indicating that power transmission has been optimized (e.g., that power is being received at a particular threshold, such as at least 90%). The alignment detection 110 can provide driving controls 111 to the drive system 140 of the self-propelled device in order to cause the device to move in the appropriate direction(s) to align the charging interface 150 with the charging interface of the charging station.

For example, if the self-propelled device is a remote-controlled toy car, the alignment detection 110 can use the driving controls 111 to cause one or more wheels of the device to swivel (e.g., make the car turn left or right) and rotate (e.g., move the car forward or backward) a particular amount in order to substantially align the charging interface 150 with the charging interface of the charging station. In another example, if the self-propelled device is a spherical device that is capable of using a drive system 140 capable of causing the device to roll, the driving controls 111 can cause the device to roll in a particular direction so that each of the pitch, roll, or yaw angles are within the appropriate threshold corresponding to the optimal position/orientation of the self-propelling device. In this manner, system 100 enables the device to self-optimize the power transmission during its charging process.

In one embodiment, the alignment detection 110 can also search for the location of maximum power transfer. For example, the alignment detection 110 can continually or periodically receive updated power information 133 or position/movement information 121 as it causes the device to move, rotate, and/or reposition itself with respect to the surface of the charging station in order to achieve alignment (and maximum power transfer). The alignment detection 110 can intelligently search for the region or area on the surface of the charging station by using the updated power information 133 and/or position/movement information 121 to determine whether the device is being moved closer to achieving alignment (or maximum power transfer) or being moved further away. In this manner, the alignment detection 110 can dynamically control the drive system 140 to search and find the location for receiving a maximum amount of power.

Methodology

Figure 2:
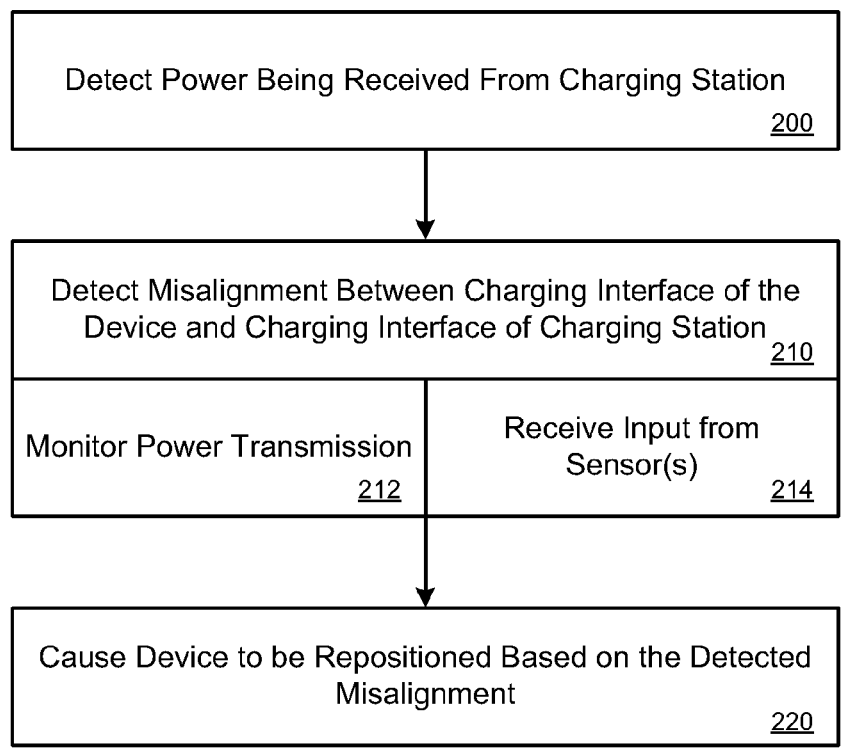
FIG. 2 illustrates an example method for operating a self-optimizing power transfer device, according to an embodiment.

A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described. FIG. 2 illustrates an example method for operating a self-optimizing power transfer device, according to an embodiment.

In FIG. 2, the self-propelled device detects power being received from a charging station in order to charge a power source (e.g., a rechargeable battery) of the device (step 200). The self-propelled device can include a charging interface 150 that receives power from the charging station and can recharge the battery of the device. In some embodiments, the charging interface can be an inductive charging interface that receives magnetic energy (e.g., via one or more coils) and converts it to electrical energy. When the power management 130 detects that an amount of power is being received from the charging station via the charging interface 150, the alignment detection 110 can determine that the self-propelled device is being charged (e.g., is placed on a surface of the charging station).

The device also detects whether there is misalignment between the charging interface 150 of the device and the charging interface of the charging station (step 210). According to embodiments, the alignment detection 110 can detect the charging interfaces are misaligned by monitoring the power transmission from the charging station (sub-step 212) and/or by detecting current device state/position/orientation using sensor inputs (sub-step 214). When the alignment detection 110 monitors the power transmission, it can compare the received power information 133 with a threshold amount of power (or rate of power) the charging interface 150 should be receiving under optimal or efficient conditions. If the alignment detection 110 determines that the amount of power being received is less than a predetermined threshold, the alignment detection 110 can determine that the charging interfaces are misaligned.

In another embodiment, the alignment detection 110 can detect whether there is misalignment by receiving position/movement information 121 based on sensor inputs from one or more sensors and comparing the current device position/orientation with the optimal position/orientation that the self-propelling device should be positioned in. If the alignment detection 110 determines that the position/orientation of the device is different more than a threshold amount (e.g., the pitch, roll, and/or yaw is different by five or more degrees), the alignment detection 110 can determine that the charging interfaces are misaligned.

In response to detecting that the charging interfaces of the device and the charging station are misaligned (based on the monitored power or based on sensor inputs), the alignment detection 110 can automatically cause the device to be moved based on the detected misalignment (step 220). For example, the device can be a self-propelling device that can automatically move its position or orientation relative to the charging station in response to the sensor inputs (and/or in response to power signal inputs). The alignment detection 110 can cause the device to be moved by controlling the drive system of the device. The device will be moved in one or more directions (or rotate or change orientations) in order to achieve substantial alignment between the charging interface 150 of the device and the charging interface of the charging station.

In some embodiments, because the alignment detection 110 can measure the amount of misalignment (e.g., the difference between the degrees of the pitch, roll, and/or yaw of the current device position/orientation with the degrees of the respective optimal position/orientation that the device should be in for efficient recharging), the device can be caused to move to correct the measured amount of misalignment (e.g., if the pitch is off by 15 degrees, rotate by 15 degrees in the opposite direction).

In one embodiment, the self-propelled device can detect whether there is misalignment between the charging interfaces even without first detecting that power is being received from the charging station. For example, the self-propelled device can be placed into a charging state (e.g., via a user input) or be aware that the user is attempting to charge the device using one or more sensors of the self-propelled device and/or one or more sensors of the charging station. In some embodiments, the self-propelled device can automatically determine that there is misalignment between the charging interfaces when the device is placed in charging state and (i) no power is being received from by the charging interface of the device (e.g., the power management 130 transmits power information 133 to the alignment detection that indicates that no power is being received), and/or (ii) the rotational angles of the device (e.g., the pitch, roll, yaw) are significantly different from the angles corresponding to the optimal position/orientation the self-propelling device should be in for efficient charging.

As an addition or alternative, in response to detecting that the charging interfaces of the device and the charging station are misaligned (based on the monitored power and/or based on sensor inputs), the alignment detection 110 can also search for the location of maximum power transfer. In one embodiment, the alignment detection 110 can intelligently search for a location on the surface of the charging station by using the monitored power and/or sensor inputs to determine if the device is being moved closer to achieving alignment (or maximum power transfer) or being moved further away. The alignment detection 110 can dynamically control the drive system 140 to search and find the location for receiving a maximum amount of power. In other embodiments, the alignment detection 110 can use received and/or stored information (e.g., stored in a memory resource) about the charging station (e.g., which can provide information about where the charging interfaces are positioned on the charging surface) to search for the location of maximum power.

According to one or more embodiments, the steps described in FIG. 2 can be performed by components implemented by resources on multiple devices. For example, the self-propelled device can include a wireless communication component for implementing wireless communications with another device (e.g., a controller remote from the self-propelled device, such as a remote-control or a smart phone). The wireless communication component can implement a WI-FI protocol, a BLUETOOTH protocol, or other protocols in alternative implementations. Using the wireless communication component, the self-propelled device can transmit, to the remote device, information that some amount of power is being received from a charging station (e.g., that it is being charged) (step 200).

The remote device can also receive information about the power transmission and/or information about the current state/position/orientation of the self-propelled from the self-propelled device so that it can use its memory and processing resources to detect whether there is misalignment between the self-propelled device and the charging station (step 210). The remote device can transmit control signals for controlling the movement of the self-propelled device to achieve alignment on the charging station (step 220). During this time, the remote device can continue to receive power information of the power transmission and/or current position/orientation information of the self-propelled device (e.g., real-time feedback) to better control the drive system of the self-propelled device.

Example Scenarios

Figure 3:
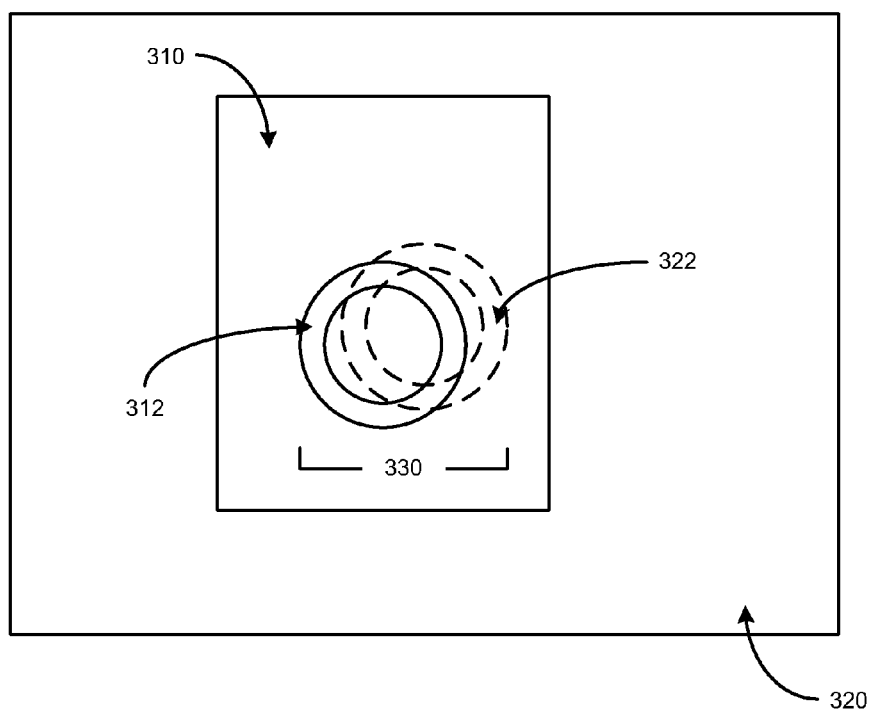
FIG. 3 illustrates an example scenario of a device detecting misalignment, under an embodiment.

FIG. 3 illustrates an example scenario of a device detecting misalignment, under an embodiment. The operation of the self-propelled device in FIG. 3 can be performed by using the system described in FIG. 1 and method described in FIG. 2. In particular, FIG. 3 illustrates a top view (e.g., looking down from a user's viewpoint) of a self-propelled device being positioned on a surface of a charging station. In FIG. 3, a user has placed the self-propelled device 310 on a surface of the charging station 320 in order to recharge the power source of the self-propelled device 310. In one embodiment, the charging interface of the self-propelled device 310 and the charging interface of the charging station 320 can be inductive charging interfaces. The self-propelled device 310 can include one or more coils 312 as part of its charging interface and the charging station 320 can include one or more coils 322 as part of its charging interface.

In the example provided, the user has assumed that the charging interfaces of the device and charging station will be aligned in a particular region of the surface of the charging station 320 (e.g., near the center of the charging station 320), and has initially placed the self-propelled device 310 in that region. However, as illustrated in FIG. 3, the coil 312 of the charging interface of the self-propelled device 310 and the coil 322 of the charging interface of the charging station 320 are misaligned 330 (e.g., they are not substantially aligned with each other). Because misalignment 330 is present, the power transmission has not been optimized (e.g., it is not efficient).

When the self-propelled device 310 is placed into contact with the charging station 320 so that at least some amount of power can be transmitted via the charging interfaces, the self-propelled device 310 can determine that charging has been initiated. The self-propelled device 310 can detect whether misalignment 330 exists between the charging interfaces and can also determine the amount of misalignment based on power transmission information and/or current device state/position/orientation information. Based on this information, the self-propelled device 310 can automatically be caused to move or reposition itself with respect to the charging station 320 in order to achieve alignment (e.g., correct or reduce the misalignment 330). For example, the self-propelled device 310 can control its drive system to substantially align the one or more coils 312 of its charging interface with the one or more coils 322 of the charging interface of the charging station 320.

Figure 4A:
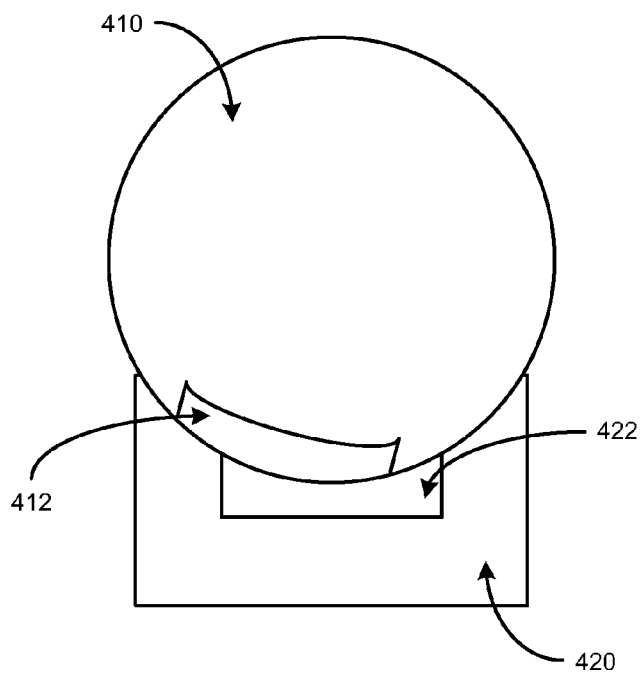
FIGS. 4A-4B illustrate an example scenario of a self-optimizing power transfer device and a charging station, under an embodiment.
Figure 4B:
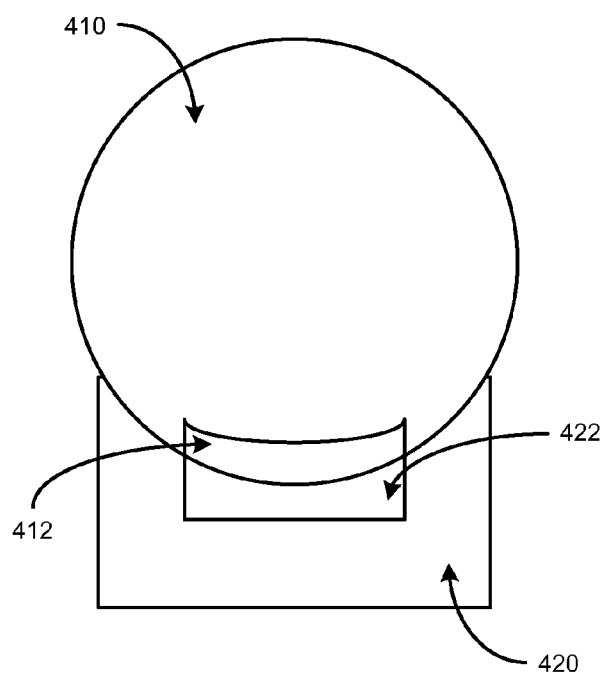

FIGS. 4A-4B illustrate an example scenario of a self-optimizing power transfer device and a charging station, under an embodiment. In particular, FIGS. 4A-4B illustrate a cross-sectional view of the self-optimizing power transfer device being docked with or placed in contact with the charging station, according to an embodiment. The operation of the self-propelled device in FIGS. 4A-4B can be performed by using the system described in FIG. 1 and method described in FIG. 2.

The example scenario of FIGS. 4A-4B illustrate a potential challenge a user may encounter in trying to manually align the charging interfaces of a self-propelled device and a charging station. For example, because the device 410 in FIGS. 4A-4B is in the shape of a sphere, there is no top or bottom of the device (e.g., compared to a remote-controlled toy car, for example). As such, it may be difficult for the user to know exactly where the charging interface 412 of the device 410 is located (especially if the charging interface 412 is an inductive charging interface without exposed electrical contacts).

According to an embodiment, the self-propelled device 410 can have a housing in a shape of a sphere. The charging station 420 can have a housing with a base and an upper surface (e.g., a receptacle) that is contoured to receive the self-propelled device 410 when the self-propelled device 410 is placed into contact with the upper surface (e.g., when the device 410 is to be charged). The charging interface 422 of the charging station 420 can be provided within the housing of the charging station 420 in or near the center of the receiving surface. In one embodiment, the charging interface 422 can be shaped so that at least a portion of the charging interface 422 is shaped to mirror the shape of the housing of the charging station 420. For example, the charging interface 422 can include one or more coils (e.g., wires that are wound in a circle) that can be wound so that it curves with the curvature of the housing of the charging station 420. Similarly, the charging interface 412 can include one or more coils that are wound to match the spherical shape of the housing of the device 410.

When the user wants to charge the self-propelled device 410 using the charging station 420, the user can try to estimate the location of charging interface 412 within the device 410 and try to align the charging interface 412 with the charging interface 422 of the charging station 420. In one embodiment, the housing of the device 410 can include one or more features that the user can use to try to align the charging interface 412 with the charging interface 422 (e.g., a marking on the surface of the housing of the device 410 that indicates where the charging interface 412 is located, or a marking on a surface of the housing of the device 410 that indicates to the user that the charging interface 412 is on the opposing surface). In another embodiment, the device 410 can be weighted toward the charging interface 412.

In FIG. 4A, the user has placed the self-propelled device 410 in the charging station 420 in order to charge the power source of the device 410. However, the charging interface 412 of the self-propelled device 410 and the charging interface 422 of the charging station 420 are misaligned from each other (e.g., is not substantially aligned) so that power is not being optimally or efficiently transmitted and/or received by the charging interface 412. The self-propelled device 410 detects that charging has occurred and detects that there is a misalignment between the charging interface 412 and the charging interface 422 (as described in FIGS. 1 and 2).

In response to detecting the misalignment, the device 410 can be automatically caused to move on the surface of the charging station 420 until the charging interface 412 and the charging interface 422 reach substantial alignment. In one embodiment, the drive system of the device 410 can include multiple motors and wheels within the spherical housing of the device 410 to cause the device 410 to move in one or more directions, in one or more speeds. The device 410 can control the drive system to cause the device to, for example, rotate or rock back and forth within the receiving surface of the charging station 420 in order for the charging interfaces 412, 422 to achieve alignment. Once the device 410 determines that substantial alignment has been achieved, as illustrated in FIG. 4B, the device 410 can remain stationary with respect to the charging station 420.

Hardware Diagram

Figure 5:
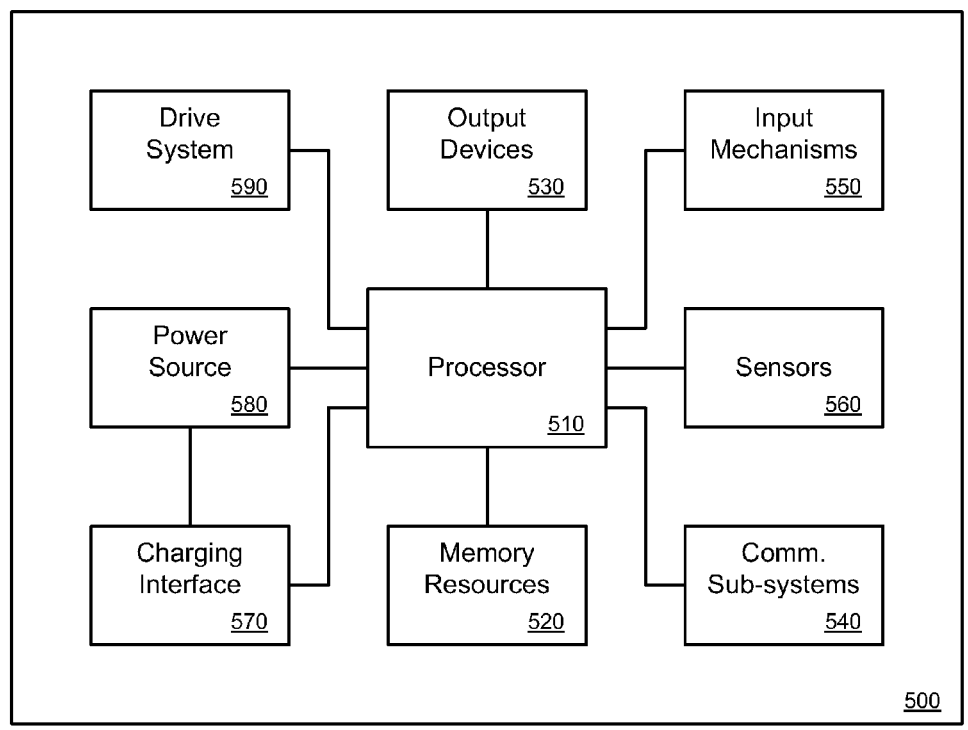
FIG. 5 illustrates an example hardware diagram of a self-optimizing power transfer device, under an embodiment.

FIG. 5 illustrates an example hardware diagram of a self-optimizing power transfer device, under an embodiment. For example, in the context of FIG. 1, system 100 may be implemented by memory and processor resources as described in FIG. 5.

In one embodiment, the self-propelled device 500 includes one or more processors 510, memory resources 520, one or more output devices 530, one or more communication sub-systems 540 (including wireless communication sub-systems), and one or more sensors 560. According to different implementations, the communication sub-systems 540 enables the device 500 to exchange wireless communications with another device using different mediums and protocols (e.g., WI-FI, BLUETOOTH, Infrared). The device 500 can also include a charging interface 570, a power source 580 (e.g., one or more batteries), and a drive system 590. In some embodiments, the device 500 can also include one or more input mechanisms 550 (e.g., a button, a switch, a touch-sensitive input device).

The processor 510 is configured with software and/or other logic to perform one or more processes, steps and other functions described with embodiments, such as described by FIGS. 1-4B, and elsewhere in the application. Processor 510 is configured, with instructions and data stored in the memory resources 520, to implement the system 100 (as described with FIG. 1). For example, instructions for implementing the alignment detection, the IMU, and the power management can be stored in the memory resources 520 of the device 500. The processor 510 can execute instructions for detecting whether the charging interface 570 of the device 500 is substantially aligned (or misaligned) with the charging interface of a charging station, and if misalignment is detected, automatically control the drive system 590 to cause the device 500 to move or reposition itself on the surface of the charging station to achieve alignment.

In one embodiment, the processor 510 can control the output devices 530, such as a speaker or one or more light sources, in order to provide an indication to a user of one or more operations of the device 500. For example, in some embodiments, the processor 510 can cause a speaker to output a noise (e.g., a beep sound or buzz sound) if misalignment is detected, or cause a light source to be turned on (e.g., a green color compared to a red color) if alignment is achieved. Although FIG. 5 illustrates the power source 580 only being coupled to the charging interface 570, the other components of device 500 can also be coupled to the power source 580 in order to be powered.

Alternative Embodiments

In an alternative embodiment, the system and method as described in FIGS. 1-2, for example, can be implemented by memory and processing resources of a vehicle, such as a car. A charging interface, such as an inductive charging interface, may be provided on an underside region of the vehicle so that it can receive power from another charging interface that is provided on a charging station (e.g., one that is low to the ground). The vehicle can be parked over a charging station by a user, for example, in a garage or parking space so that the charging interface can receive power from the charging interface of the charging station when the interfaces are substantially aligned. If the vehicle is parked and the system detects misalignment, the vehicle or the charging interface can be automatically caused to move in one or more directions until alignment is achieved (e.g., without the user having to manually move the vehicle).

In other embodiments, the self-propelled device can also be an automatic vacuum cleaner that automatically returns to its charging station after a cleaning period.

In another embodiment, one or more components of the system 100 can be implemented by the charging station when the self-propelled device is placed into contact with a surface of the charging station (e.g., when the device is initially being charged). The charging station can be the remote device that can wirelessly communicate with the self-propelled device, as discussed with respect to FIGS. 1-2. The charging station or dock can include one or more mechanical features that can cause the self-propelled device to be moved relative to the charging interface of the charging station. For example, when misalignment is detected, at least a portion of the surface (just above the charging interface) of the charging station can move so that the self-propelled device can be rotated or moved relative to the charging interface of the charging station until alignment is achieved.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method for charging a power source of a self-propelled device having a spherical housing and an internal drive system within the spherical housing to propel the self-propelled device, the method being performed by one or more processors of the self-propelled device and comprising:

detecting a misalignment between an inductive charging interface of the self-propelled device and an inductive charging interface of a charging dock when the self-propelled device is placed in a receptacle of the charging dock; and in response to detecting the misalignment, automatically causing the internal drive system of the self-propelled device to rotate within the spherical housing of self-propelled device, so as to move the inductive charging interface of the self-propelled device relative to the charging dock to achieve an alignment between the inductive charging interface of the self-propelled device and the inductive charging interface of the charging dock, wherein detecting the misalignment includes at least one of (a) monitoring an amount of power being received by the self-propelled device from the charging dock, and (b) receiving input from one or more sensors of the self-propelled device that indicate one or more angles of rotation of the self-propelled device relative to the charging dock.

2. The method of claim 1, wherein detecting the misalignment includes monitoring the amount of power being received by the self-propelled device from the charging dock.

3. The method of claim 2, wherein detecting the misalignment includes determining that the amount of power being received by the self-propelled device is less than a threshold amount.

4. The method of claim 3, wherein automatically causing the internal drive system to rotate within the spherical housing relative to the charging dock to achieve the alignment is performed in response to determining that the amount of power being received by the self-propelled device is less than the threshold amount.

5. The method of claim 1, wherein detecting the misalignment includes receiving input from the one or more sensors of the self-propelled device that indicate one or more angles of rotation of the self-propelled device relative to the charging dock.

6. The method of claim 5, wherein detecting the misalignment includes determining that the one or more angles of rotation of the self-propelled device is different than one or more threshold angles of rotation by a threshold amount.

7. The method of claim 6, wherein automatically causing the internal drive system to rotate relative to the charging dock to achieve the alignment is performed in response to determining that the one or more angles of rotation of the self-propelled device is different than one or more threshold angles of rotation by the threshold amount.

8. The method of claim 5, wherein the input from the one or more sensors is based on a downward direction of gravity.

9. The method of claim 1, wherein automatically causing the internal drive system to rotate within the spherical housing comprises adjusting a pitch, a roll, and a yaw of the internal drive system to achieve the alignment.

10. A self-propelled device comprising:
    a spherical housing;
    a power source;
    an inductive charging interface coupled to the power source;
    an internal drive system within the spherical housing for propelling the self-propelled device; and
    a control mechanism coupled to the inductive charging interface and the internal drive system, the control mechanism to (i) detect a misalignment between the inductive charging interface of the self-propelled device and an inductive charging interface of a charging station when the self-propelled device is placed in a receptacle of the charging station, and (ii) in response to detecting the misalignment, automatically causing the internal drive system to rotate within the spherical housing of the self-propelled device, so as to move the inductive charging interface of the self-propelled device relative to the charging station and the spherical housing to achieve an alignment between the inductive charging interface of the self-propelled device and the inductive charging interface of the charging station, wherein the control mechanism detects the misalignment by at least one of (a) receiving input from one or more sensors that indicate one or more angles of rotation of the internal drive system relative to the charging station and (b) analyzing a power signal from the charging station.

11. The self-propelled device of claim 10, further comprising the one or more sensors, wherein the control mechanism uses the one or more sensors in order to detect the misalignment.

12. The self-propelled device of claim 11, wherein the control mechanism detects the misalignment by receiving the input from the one or more sensors that indicate one or more angles of rotation of the self-propelled device relative to the charging station.

13. The self-propelled device of claim 12, wherein the control mechanism detects the misalignment by determining that the one or more angles of rotation of the self-propelled device are different from one or more threshold angles of rotation by a threshold amount.

14. The self-propelled device of claim 10, wherein the control mechanism detects the misalignment by analyzing the power signal from the charging station, and determining that an amount of power being received by the self-propelled device is less than a threshold amount.

15. The self-propelled device of claim 10, wherein automatically causing the internal drive system to rotate within the spherical housing comprises adjusting a pitch, a roll, and a yaw of the internal drive system to achieve the alignment.

16. The self-propelled device of claim 10, wherein the control mechanism includes one or more processors.

17. A system comprising:
    a charging station comprising an inductive charging interface; and
    a self-propelled device comprising:
    a spherical housing;
    a power source;
    an inductive charging interface coupled to the power source;
    an internal drive system within the spherical housing for propelling the self-propelled device; and
    a control mechanism coupled to the inductive charging interface and the internal drive system, the control mechanism to (i) detect a misalignment between the inductive charging interface of the self-propelled device and the inductive charging interface of the charging station when the self-propelled device is placed in a receptacle of the charging station, and (ii) automatically cause the internal drive system to rotate within the spherical housing of the self-propelled device, so as to move the inductive charging interface of the self-propelled device relative to the charging station to achieve an alignment between the inductive charging interface of the self-propelled device and the inductive charging interface of the charging station, wherein the control mechanism detects the misalignment by at least one of (a) receiving input from one or more sensors that indicate one or more angles of rotation of the internal drive system relative to the charging station and (b) analyzing a power signal from the charging station.

18. The system of claim 17, wherein the self-propelled device further comprises the one or more sensors, and wherein the control mechanism of the self-propelled device uses the one or more sensors in order to detect the misalignment.

19. The system of claim 18, wherein the control mechanism of the self-propelled device detects the misalignment by (i) receiving input from the one or more sensors that indicate one or more angles of rotation of the self-propelled device relative to the charging station, and (ii) determining that the one or more angles of rotation of the self-propelled device are different from one or more threshold angles of rotation by a threshold amount.

20. The system of claim 17, wherein the control mechanism of the self-propelled device detects the misalignment by (i) analyzing the power signal from the inductive charging interface of the self-propelled device, and (ii) determining that an amount of power being received by the self-propelled device is less than a threshold amount.

* * * * *